United States Patent [19]

Skelton et al.

[11] Patent Number: 5,257,175
[45] Date of Patent: Oct. 26, 1993

[54] ANALOG CONTROL OF INDUCTIVE FLYBACK VOLTAGES IN A FULL BRIDGE CIRCUIT

[75] Inventors: Dale J. Skelton, Plano; Kuok Y. Ling, Webster; Myron G. Manternach, Houston, all of Tex.

[73] Assignee: Texas Instruments Incorporated, Dallas, Tex.

[21] Appl. No.: 880,956

[22] Filed: May 8, 1992

[51] Int. Cl.$^5$ ................................. H02M 7/5387
[52] U.S. Cl. ................................. 363/56; 363/63
[58] Field of Search ................... 363/63, 98; 318/293, 318/599

[56] References Cited

U.S. PATENT DOCUMENTS

| | | | |
|---|---|---|---|
| 4,066,945 | 1/1978 | Korte | 318/681 |
| 4,371,824 | 2/1983 | Gritter | 363/56 |
| 4,520,255 | 5/1985 | Bredenkamp et al. | 363/98 |
| 4,545,004 | 10/1985 | Kade et al. | 363/63 |
| 5,140,515 | 8/1992 | Menniti et al. | 363/98 |

OTHER PUBLICATIONS

Sedra and Smith, *Microelectronic Circuits*, Second Edition, Holt, Rinehart, and Winston, Inc., 1987, pp. 561–563, 935–937.

Allen and Holberg, *CMOS Analog Circuit Design*, Holt, Rinehart, and Winston, Inc., 1987, pp. 66–71.

*Primary Examiner*—William H. Beha, Jr.
*Attorney, Agent, or Firm*—Thomas G. Eschweiler; Richard Donaldson; James C. Kesterson

[57] ABSTRACT

A voltage regulation circuit for use in "H" bridge circuit applications utilizes feedback networks to provide analog voltage regulation of the output nodes during switching of inductive loads. The regulation of the ouptut nodes during switching of inductive loads eliminates substrate current injection.

5 Claims, 4 Drawing Sheets

ANALOG CONTROL OF INDUCTIVE FLYBACK VOLTAGES IN A FULL BRIDGE CIRCUIT

FIELD OF THE INVENTION

This invention is in the field of semiconductor integrated circuits and relates primarily to switching inductive loads.

BACKGROUND OF THE INVENTION

Various techniques exist for driving inductive loads. One popular method is the "full bridge" configuration (also called the "H" bridge configuration) as shown in FIG. 1. Semiconductor switches 50, 52, 54 and 56 are coupled to a load 58 such that the circuit looks like the letter "H". This method is popular because it allows the load to be driven in both directions (through conduction path I and conduction path II). This enables one to drive bi-directional motors, etc.

The "H" bridge drive configuration, however, does have disadvantages. After switching, inductive flyback can forward bias transistor junctions that are designed to remain reverse biased, causing electrons to be injected into the substrate which in turn cause parametric shifts and potential latch-up conditions leading to device failure. (Inductive flyback is an abrupt change in voltage across the terminals of an inductive load caused by the load attempting to change instantaneously; this property is well known and understood by those skilled in the art.) The substrate current injection phenomena can be clearly seen in FIG. 2. FIG. 2 is a cross section drawing of a prior art LDMOS (lateral double diffused MOS) transistor 60. Transistor 60 has a metal source contact 62 making electrical contact to both N+ source contact 68a and P+ backgate contact 70a which electrically shorts source diffusion 68b and backgate diffusion 70b together. Thus, a P-N junction exists between the backgate 70b and drain 72b. Therefore, if the voltage at source contact 62 to rise approximately 0.5 V above the voltage at drain contact 66 the P-N junction would become forward biased and current would be injected into the substrate.

Different methods exist to eliminate substrate injection. Placing external, discrete Schottky diodes in parallel with the output transistors shunt the injected substrate current away from the semiconductor die. This solution takes up space on a circuit board and increases the overall system cost. Surrounding the output transistor structures with guardrings in the layout to collect the substrate current requires backside metallization to minimize substrate debiasing and is, therefore, cost prohibitive. Further methods are needed to control substrate current injection.

It is an object of this invention to provide a novel "H" bridge drive circuit that controls inductive flyback voltage, thereby eliminating substrate injection. Other objects and advantages of the invention will become apparent to those of ordinary skill in the art having reference to the following specification together with the drawings herein.

SUMMARY OF THE INVENTION

An integrated circuit provides output node voltage regulation through use of feedback networks to eliminate substrate current injection produced when switching inductive loads. Four transistors are designed in an "H-bridge" circuit configuration. Feedback networks are connected between the transistors and the output nodes which provide feedback to the transistors during switching thus regulating the load node voltages such that substrate current injection is prevented.

DETAILED DESCRIPTION OF PREFERRED EMBODIMENT

Figure 3:
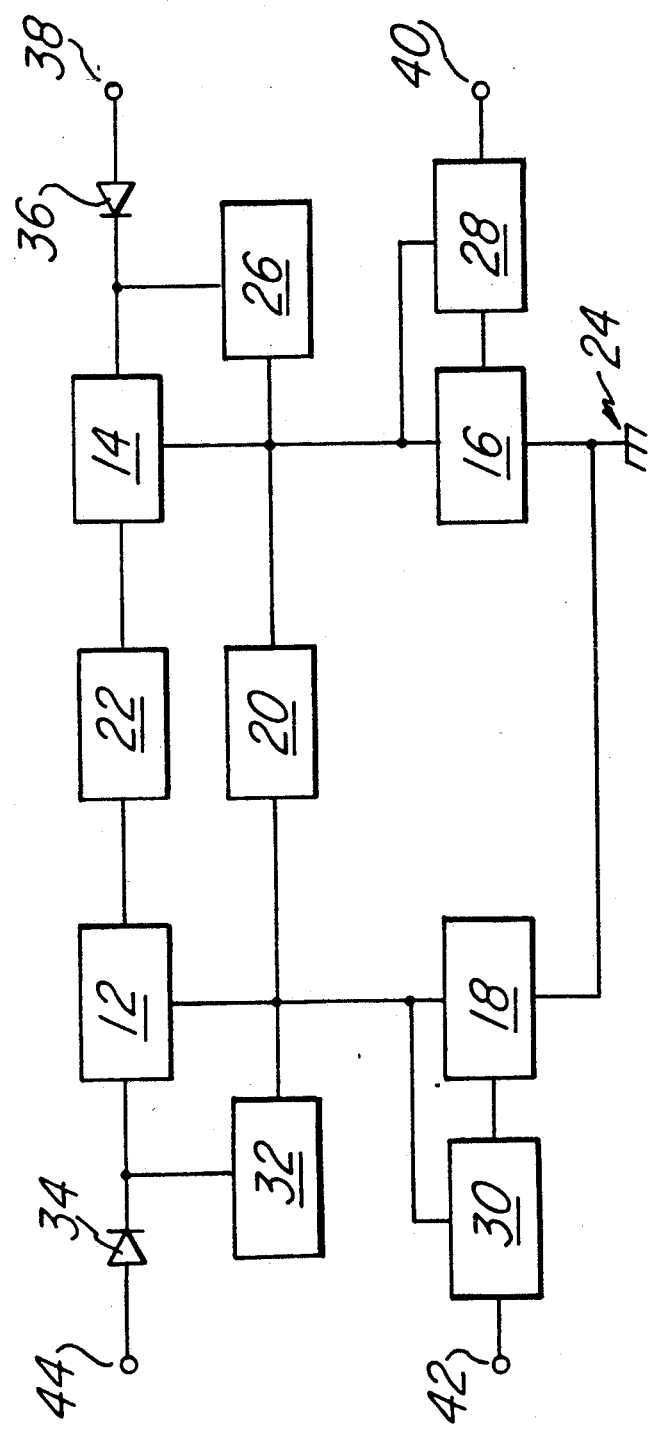
FIG. 3 is a block diagram illustrating the preferred embodiment of the invention.
Figure 4A:
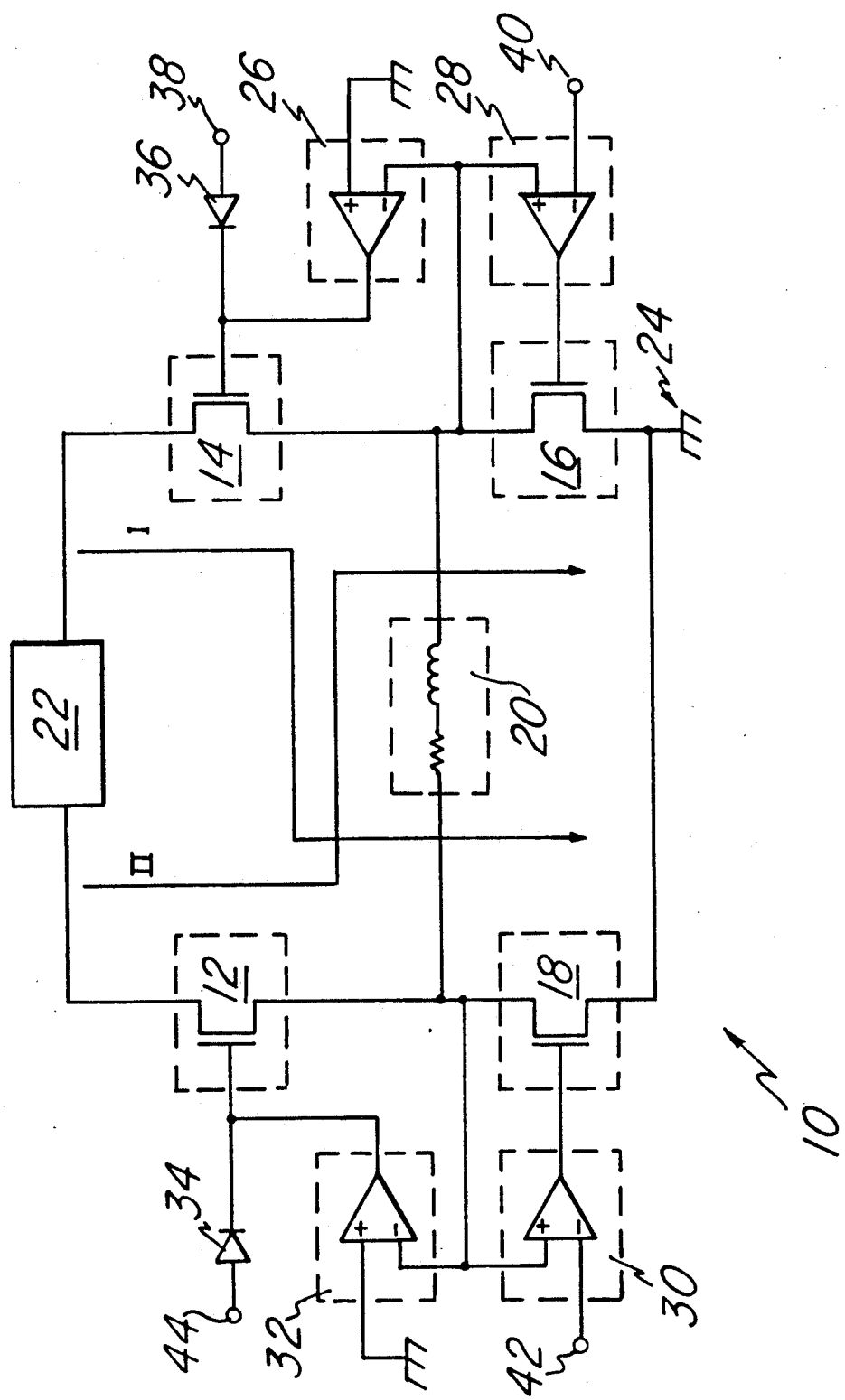
FIG. 4a is a circuit drawing illustrating the preferred embodiment of the invention.

FIG. 3 is a block diagram illustrating the preferred embodiment of the invention while FIG. 4a is an electrical schematic diagram of the block diagram of FIG. 3. The "H" bridge configuration is composed of four semiconductor switches 12, 14, 16 and 18, a power supply 22, load voltage feedback circuitry 26, 28, 30 and 32, and a load 20. Semiconductor switches 12, 14, 16 and 18 may be composed of MOS transistors, load voltage feedback circuitry 26, 28, 30 and 32 may be composed of operational amplifiers, and load 20 may be an inductive load such as a bi-directional motor.

The flyback control circuit 10 of FIG. 4a is composed of a power LDMOS RESURF transistor 12 (lateral double diffused MOS RESURF transistor, hereafter referred to as a transistor) with a drain coupled to a power supply rail ($V_{DD}$) 22, a gate coupled to both a cathode of diode 34 and an output of operational amplifier 32 (hereafter referred to as op-amp), and a source coupled to an inductive load 20, an input to op-amp 30, an input to op-amp 32, and a drain of a second transistor 18. The anode of diode 34 is coupled to a circuit input 44; the second input to op-amp 32 is coupled to circuit ground 24. Transistor 18 has a gate coupled to the output of op-amp 30 and a source coupled to circuit ground 24. Second op-amp 30 has a second input coupled to a circuit input 42. A third transistor 14 has a drain coupled to power supply rail ($V_{DD}$) 22, a gate coupled to both a cathode of diode 36 and an output of op-amp 26, and a source coupled to inductive load 20, an input to op-amp 26, an input to op-amp 28, and to a drain of a fourth transistor 16. The anode of diode 36 is coupled to a circuit input 38 and the second input to op-amp 26 is coupled to circuit ground 24. Transistor 16 has a gate coupled to the output of op-amp 28 and a source coupled to circuit ground 24. Op-amp 28 has a second input coupled to a circuit input 40.

FIG. 4a illustrates the "H" bridge configuration flyback control circuit 10 having a conduction path I and a conduction path II. Conduction paths I and II are heavily darkened lines. The operation of the circuit is described with reference to conduction paths I and II.

As a simplistic overview, when operating through conduction path I, transistor 14 and transistor 18 will be conducting (hereafter referred to as "on") while transistor 12 and transistor 16 will be nonconducting (hereafter referred to as "off"). The current travels through conduction path I from power supply 22 through transistor 14, through load 20, and through transistor 18 to circuit ground 24. When control circuitry mandates the load 20 to be driven in the opposite direction, the circuit switches and transistors 14 and 18 will stop conducting while transistors 12 and 16 will turn on and the circuit will conduct through conduction path II.

The following is a detailed explanation of circuit 10 operation. Input control voltages at inputs 38 and 44 are digital signals with a "high" voltage being a specific voltage greater than the supply voltage ($V_{DD}$) and the "low" voltage being zero volts (0 V). The input control voltages at inputs 40 and 42 are analog controlled inputs and may vary anywhere between zero volts (0 V) and $V_{DD}$. A low control voltage at input 44 prevents transistor 12 from conducting. An analog control voltage on input 42 of any value less than $V_{DD}$ causes the output of op-amp 30 to be high thus causing transistor 18 to turn on. (The node voltage at node 48 is at a value equal to the voltage at input 42 due to a steady state circuit condition). A "high" control voltage at input 38 turns transistor 14 on. An analog control voltage at input 40 of $V_{DD}$ turns transistor 16 off. Therefore, with the specified conditions on the input terminals, transistors 14 and 18 are on and transistors 12 and 16 are off and the conduction path is through path I.

Figure 4B:
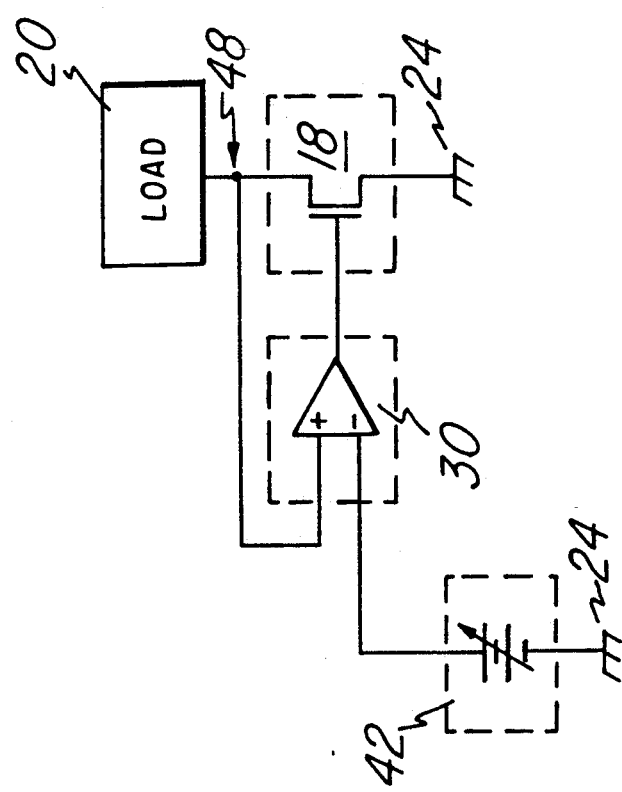
FIG. 4b is a circuit drawing illustrating the node voltage regulation feature of the invention.

A significant inventive feature of the inductive flyback control circuit is exhibited during load switching. Load switching occurs when input control voltages dictate the transistors that are conducting to turn off and the transistors that are off to be turned on. This causes current to be forced through load 20 in the opposite direction. This occurs, for example, in switching a bi-directional motor. The analog control voltage at input 42, goes to $V_{DD}$. This causes the output of op-amp 30 to go low, thus regulating transistor 18. The control voltage at input 38 then goes low and regulates transistor 14. Since current cannot change instantaneously through an inductive load, the voltage polarity across load 20 reverses and becomes quite large as predicted by the voltage-current relationship for an inductor, wherein:

$$V = L(di/dt)$$

with "V" representing the voltage drop across inductive load 20, "L" representing the inductance magnitude of inductive load 20, and "di/dt" representing the change in current per unit time. Thus, as current attempts to quickly change direction through inductive load 20 "di/dt" becomes negative. Consequently, the voltage across inductive load 20 reverses polarity at a fast rate. As the voltage at node 48 attempts to fly high, op-amp 30 and transistor 18 regulate node voltage 48 to $V_{DD}$. FIG. 4b helps illustrate how the regulation feature works.

In FIG. 4b the circuit is simplified by eliminating extraneous circuitry. Load 20 is connected to transistor 18 through node 48 and to the input of op-amp 30. Analog control input 42 is represented as a variable voltage source since input 42 can provide any voltage between zero volts (0 V) and $V_{DD}$. When load 20 is switched node voltage 48 attempts to fly high. Input control voltage 42 is presently at $V_{DD}$. As node voltage 48 increases above $V_{DD}$ the output of op-amp 30 increases and turns transistor 18 back on which in turn attempts to pull node voltage 48 down to ground 24. However, as node voltage 48 falls below $V_{DD}$ it feeds back to the input of op-amp 30 which results in the output of op-amp 30 going negative causing transistor 18 to turn off again. In this manner node voltage 48 is regulated to $V_{DD}$ during load 20 switching. In a similar manner it can be seen that node voltage 48 can be regulated to any voltage specified by analog control input 42. If input 42, for example, was at 7.5 V, node voltage 48 would be regulated to 7.5 V through the feedback mechanism.

Figure 1:
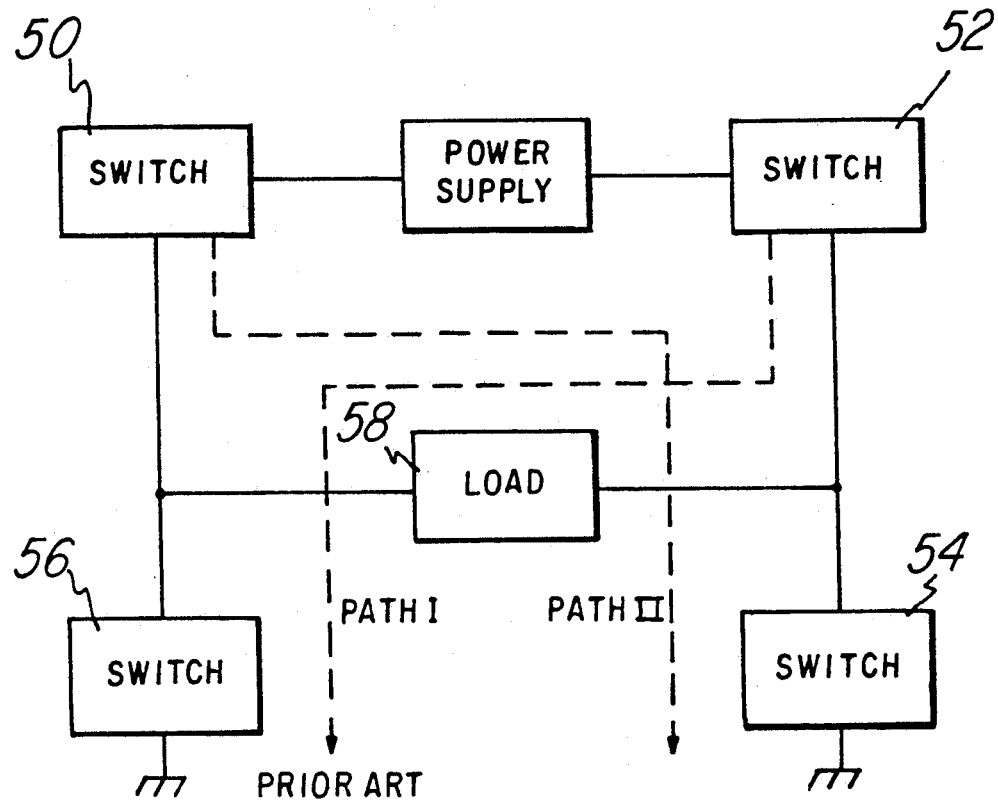
FIG. 1 is a prior art block diagram illustrating a basic "H" bridge drive circuit configuration.
Figure 2:
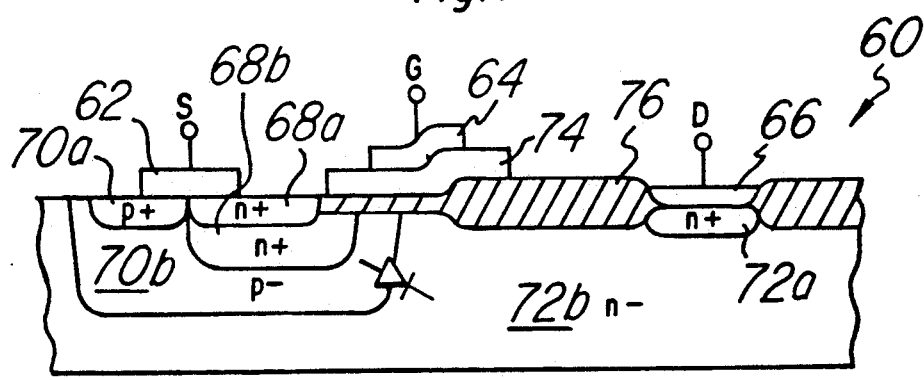
FIG. 2 is a prior art cross section drawing of an LDMOS transistor illustrating the substrate current injection phenomena.

This feedback mechanism prevents current from being injected into the substrate. Substrate current injection occurs when the voltage at node 48 (which is coupled to the source of transistor 12, see FIG. 4a) rises above the transistor 12 drain voltage (which is coupled to power supply 22) and forward biases the drain-source diode inherent in the LDMOS transistor structure. (The inherent diode referred to is illustrated in FIG. 2).

Similarly, the voltage at node 46 rapidly decreases due to the inductive flyback of load 20 during switching. As node voltage 46 tries to fall below ground it feeds back to op-amp 26 causing the output of op-amp 26 to increase thus turning transistor 14 back on. As transistor 14 turns on it attempts to pull node voltage 46 up to $V_{DD}$. However, as soon as node voltage 46 increases above ground potential it feeds back to op-amp 26 causing the output of op-amp 26 to go negative which turns transistor 14 off again. In this manner node voltage 46 is regulated to ground potential during load 20 switching.

By regulating node 46 to ground during load 20 switching node 46 cannot be pulled below ground. This eliminates substrate current injection by maintaining a reverse bias on the drain-source diode of transistor 16 because the drain of transistor 16, which is coupled to node 46, is prohibited from falling below ground 24.

Input control voltage 44 then goes high turning transistor 12 on and input control voltage 40 goes to any specified voltage less than $V_{DD}$. Current will now flow through conduction path II with current traveling from power supply 22 through transistor 12, through load 20, and through transistor 16 to circuit ground 24.

When control circuitry again mandates that load 20 switch, control voltage at input 44 goes low, thus turning off transistor 12. Input 40, simultaneously with the voltage signal at input 44, goes to $V_{DD}$. As the voltage at node 46 flies high due to the inductive flyback of load 20 it is fed back to the positive terminal of op-amp 28. As soon as node voltage 46 rises above $V_{DD}$ the output of op-amp 28 goes high turning transistor 16 on. As transistor 16 turns on it tries to pull node voltage 46 down to ground potential. As node 46 tries to fall to ground potential it gets fed back to op-amp 28. As soon as node voltage 46 falls below $V_{DD}$ the output of op-amp 28 goes negative which turns off transistor 16. Therefore, node 46 will be regulated to $V_{DD}$ during load 20 switching. This mechanism prevents current from being injected into the substrate because node voltage 46 (which is coupled to the source of transistor 14) will never rise above the transistor 14 drain voltage (which is coupled to power supply 22), causing the drain-source diode to be forward biased. In the same manner that op-amp 30 and transistor 18 could regulate node 48 to any voltage less than $V_{DD}$ in an analog mode, op-amp 28 and transistor 16 can also regulate node 46 to any voltage less than $V_{DD}$ in an analog fashion.

Similarly, as node voltage 48 rapidly decreases due to the inductive flyback of load 20 it is fed back to op-amp 32. As soon as node voltage 48 attempts to fall below ground potential, node voltage 48 is fed back to op-amp 32 causing the output of op-amp 32 to increase which turns on transistor 12. Transistor 12 turning on causes node voltage 48 to increase since transistor 12 will try to pull node 48 up to $V_{DD}$. As soon as node voltage rises above ground the output of op-amp 32 goes negative which turns transistor 12 off again. In this manner node voltage 48 is regulated at ground potential. This feature disables current from being injected into the substrate because the drain-source diode of transistor 18 remains reverse biased because node voltage 48 is not allowed to fall below ground potential. Input control voltage 38 then goes high turning transistor 14 on and input control voltage 42 goes to any specified voltage less than $V_{DD}$. Current will now flow through conduction path I with current traveling from power supply 22 through transistor 14, through load 20, and through transistor 18 to circuit ground 24.

Although the invention has been described with reference to a preferred embodiment herein, this description is not to be construed in a limiting sense. Various modifications of the disclosed embodiment will become apparent to persons skilled in the art upon reference to the description of the invention. It is therefore contemplated that the appended claims will cover any such modifications or embodiments as fall within the true scope of the invention.

What is claimed is:

1. A voltage regulation circuit, comprising:
   four semiconductor switches connected in an H-bridge configuration:
   four feedback circuit networks, wherein the feedback circuit networks are composed of single operational amplifiers with each feedback circuit network connected from the output of each semiconductor switch to the control terminal of each semiconductor switch; and
   a load connected between the outputs of the four semiconductor switches.

2. A voltage regulation circuit, comprising:
   a first semiconductor switch with three terminals, connected to a power supply, a load, and a first feedback network and first input;
   a first feedback network with three terminals, connected to a load, a circuit ground, and the first semiconductor switch;
   a second semiconductor switch with three terminals, connected to a load, a second feedback network, and circuit ground;
   a second feedback network with three terminals, connected to the load, the second semiconductor switch, and a second input;
   a third semiconductor switch with three terminals, connected to a power supply, a load, and a third feedback network and third input;
   a third feedback network with three terminals, connected to the load, a circuit ground, and the third semiconductor switch;
   a fourth semiconductor switch with three terminals, connected to the load, a fourth feedback network, and circuit ground; and
   a fourth feedback network with three terminals, connected to the load, the fourth semiconductor switch, and a fourth input.

3. A voltage regulation circuit, comprising:
   a first MOS transistor with a drain connected to a power supply, a source coupled to a load and a positive terminal of a first operational amplifier, and a gate connected to a first input and output of the first operational amplifier;
   a first operational amplifier with a negative input terminal connected to circuit ground, a positive input terminal connected to the load and source of the first MOS transistor, and an output connected to the first input and the gate of the first MOS transistor;
   a second MOS transistor with a drain connected to the load and a positive input terminal of a second operational amplifier, a gate connected to the output of the second operational amplifier, and a source connected to circuit ground;
   a second operational amplifier with a positive input terminal connected to the load and drain of the second MOS transistor, a negative input terminal connected to a second input, and an output connected to the gate of the second MOS transistor;
   a third MOS transistor with a drain connected to a power supply, a source coupled to a load and a positive terminal of a third operational amplifier, and a gate connected to a third input and output of the third operational amplifier;
   a third operational amplifier with a negative input terminal connected to circuit ground, a positive input terminal connected to the load and source of the third MOS transistor, and an output connected to the third input and the gate of the third MOS transistor;
   a fourth MOS transistor with a drain connected to the load and a positive input terminal of a fourth operational amplifier, a gate connected to the output of the fourth operational amplifier, and a source connected to circuit ground; and
   a fourth operational amplifier with a positive input terminal connected to the load and drain of the fourth MOS transistor, a negative input terminal connected to a fourth input, and an output connected to the gate of the fourth MOS transistor.

4. The voltage regulation circuit of claim 3 wherein the second and fourth inputs are connected to analog voltage control circuitry whereby the second MOS transistor and operational amplifier combination and the fourth MOS transistor and operational amplifier combination provide analog voltage control of the load.

5. The voltage regulation circuit of claim 4 wherein the MOS transistors are power LDMOS RESURF transistors.

* * * * *